United States Patent
Ong et al.

(10) Patent No.: US 8,489,584 B1
(45) Date of Patent: Jul. 16, 2013

(54) FACILITATING MEDIA CONTENT SEARCH

(75) Inventors: Edwin Seng Eng Ong, San Francisco, CA (US); Aleksandra Vikati, San Francisco, CA (US)

(73) Assignee: CastTV Inc., San Francisco, CA (US)

( * ) Notice: Subject to any disclaimer, the term of this patent is extended or adjusted under 35 U.S.C. 154(b) by 159 days.

(21) Appl. No.: 11/891,303

(22) Filed: Aug. 8, 2007

Related U.S. Application Data

(60) Provisional application No. 60/821,706, filed on Aug. 8, 2006.

(51) Int. Cl.
  *G06F 15/16* (2006.01)
  *G06F 17/20* (2006.01)

(52) U.S. Cl.
  USPC ............ 707/723; 707/913; 707/914

(58) Field of Classification Search
  USPC .................. 707/723, 913, 914, 755
  See application file for complete search history.

(56) References Cited

U.S. PATENT DOCUMENTS

| | | | |
|---|---|---|---|
| 2002/0167947 A1* | 11/2002 | Hallford et al. | 370/390 |
| 2004/0117831 A1* | 6/2004 | Ellis et al. | 725/53 |
| 2004/0177063 A1* | 9/2004 | Weber et al. | 707/3 |
| 2006/0143158 A1* | 6/2006 | Ruhl et al. | 707/3 |
| 2006/0143236 A1* | 6/2006 | Wu | 707/104.1 |
| 2006/0184608 A1* | 8/2006 | Williams et al. | 709/203 |
| 2007/0186234 A1* | 8/2007 | Cormack et al. | 725/28 |

\* cited by examiner

*Primary Examiner* — Alex Gofman

(74) *Attorney, Agent, or Firm* — Van Pelt, Yi & James LLP

(57) ABSTRACT

A method of facilitating media content search is disclosed. A rating data associated with the media content is found, at least in part programmatically, in a location other than a display page that includes a media content or a link to the media content. A search result ranking for one or both of the media content and the display page is determined at least in part using the rating data.

14 Claims, 5 Drawing Sheets

FACILITATING MEDIA CONTENT SEARCH

CROSS REFERENCE TO OTHER APPLICATIONS

This application claims priority to U.S. Provisional Patent Application No. 60/821,706 entitled TECHNIQUES FOR INCORPORATING OFFLINE RATINGS INTO MULTIMEDIA SEARCH RESULTS filed Aug. 8, 2006 which is incorporated herein by reference for all purposes.

BACKGROUND OF THE INVENTION

Search engines, such as those for the World Wide Web ("web"), typically allow a user to enter a search query in the form of one or more search terms. In response to the query, a search engine returns a list of ranked results. The ranking of each result is typically based on a variety of factors, including: the number of matching query words in the result page; the proximity of matching words to one another in the result page; the location of terms within the page; the location of terms within specific tags of the page; the anchor text on pages pointing to the result page; how recently each page has been updated; link analysis of pages pointing to this one; and click-through analysis, such as the frequency by which the result is clicked on.

There is a large volume of video, audio, and other media content ("media content") being posted to the Internet and to the web. Some media content is embedded on web pages using multimedia programs such as Flash. Some is stored on web servers and linked via HTML hyperlinks. Some is on a peer-to-peer network such as those using the BitTorrent protocol.

Search engines have been developed to search for media content. Similar to traditional search engines, media content search engines return a list of ranked results based on a user search query. However, given the particular characteristics of online media content, media content search engines that use ranking methodologies designed initially and/or primarily to find text or other non-media content may not return the most relevant ranked list.

Often there is only limited text associated with media content. For example, a web-embedded video may only have a short description consisting of the name of the show and the broadcast airdate of that particular episode of the show. In this case, ranking methodologies that use matching query word, word proximity, location of terms within the result, and so forth are unable to differentiate the ranking of different videos since the available words in the associated text are limited.

While link-analysis can typically assist in ranking media content with similar matching terms, link-analysis relies on the availability of a meaningful number of hyperlinks to the media content. However, because much web media content is generated by client-side technologies such as JavaScript and Adobe Flash, their unique URL may not be immediately apparent to end users or to standard web crawlers. Thus, the set of available hyperlinks may be smaller than optimal, making link-analysis less useful.

While click-through analysis is a good solution for older media content for which search engines have captured a large set of click-through history, for recently added media content with less click-through data, the resulting ranking can be inconsistent.

BRIEF DESCRIPTION OF THE DRAWINGS

Various embodiments of the invention are disclosed in the following detailed description and the accompanying drawings.

DETAILED DESCRIPTION

Figure 1:
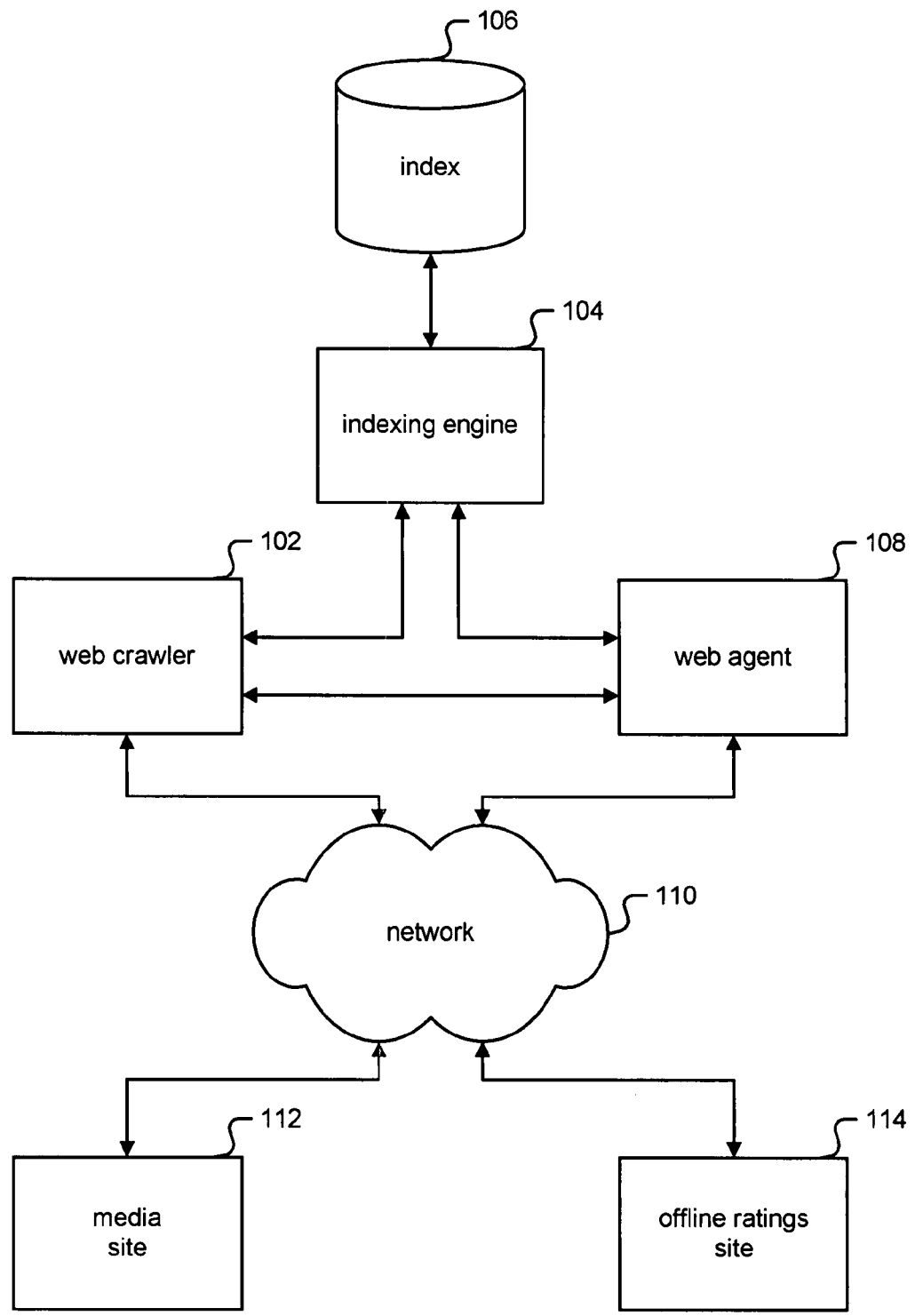
FIG. 1 is a block diagram illustrating an embodiment of a system for facilitating media content search.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Given a media content search engine, a subset of indexed media content can be matched to offline music, shows, movies, and other events for which rankings are available. For example, given a set of online video clips of a television show, the video clips can be matched collectively to the television show franchise and individually to individual episodes of the show or seasons of the show. Given a set of online audio clips, the audio clips can be matched to a song or performance. Given a set of online trailers for movies, the trailer video clips can be matched individually to individual movies. Given a set of video clips of basketball games, the video clips can be matched individually to individual basketball games.

Rankings based on different criteria ("rating data") are available for different media content genres. For example, Nielsen Media Research estimates the number of viewing households for television shows. Nielsen's ratings are available for television shows, such as the fictional show "Star Trak" used in certain examples described below, and for televised events such as basketball games. Box office sales are tracked for movies and thus are available for individual movies. Billboard Magazine estimates popularity of songs.

In some embodiments, a set of indexed media content are matched to their offline counterparts. This can be done programmatically by parsing any available indexed text and/or metadata ("media data") and subsequently matching the parsed data against local or network databases. For example, given a video with the name of a show and an airdate as its text description, parsing rules can be developed to extract the name of the show and the airdate. Given the extracted data, the video can be matched to an airing of the show on television, as identified for example by episode name and/or number, and subsequently a Nielsen or other rating, or a value based on such a rating, of that particular television airing can be associated with the online video and used to determine at least in part a search result ranking for the online video and/or a display page with which the online video is associated. The same approach can be applied to other media content using other data by developing parsing rules and using databases to match media content to rankings.

For a set of media content that have been successfully assigned rating data, the rating data can be incorporated into the ranking of search results. Assigning rating data to media content search results can improve the ranking of results, particularly in cases where existing methods cannot produce a meaningful ranked list. Improving media content search by incorporating offline rating information programmatically to the search results is disclosed.

FIG. 1 is a block diagram illustrating an embodiment of a system for facilitating media content search. In the example shown, web crawler 102 locates media content on computer networks. Web crawler 102 is connected to an indexing engine 104 that generates and maintains an index 106. Web crawler 102 is connected to web agent 108 which obtains offline information associated with media content. In some embodiments, web crawler 102 and web agent 108 may be combined in one system or program. Web crawler 102 and web agent 108 are also connected to a network 110; a public or private network and/or combination thereof, for example the Internet, an Ethernet, serial/parallel bus, intranet, Local Area Network ("LAN"), Wide Area Network ("WAN"), and other forms of connecting multiple systems and/or groups of systems together.

The network 110 connects web crawler 102 and web agent 108 with a variety of different web sites each of which may include or reference media content. In the example shown in FIG. 1, a media site 112 comprises one or more display pages with media content and media data. In the example shown in FIG. 1, in a location other than the display page on media site 112, an offline rankings site 114 ranks the offline counterpart represented by the media content on media site 112. On some sites, the offline rankings may also be stored on media site 112 on a separate display page. In some embodiments, the offline rankings may also be stored locally to web agent 108.

Figure 2:
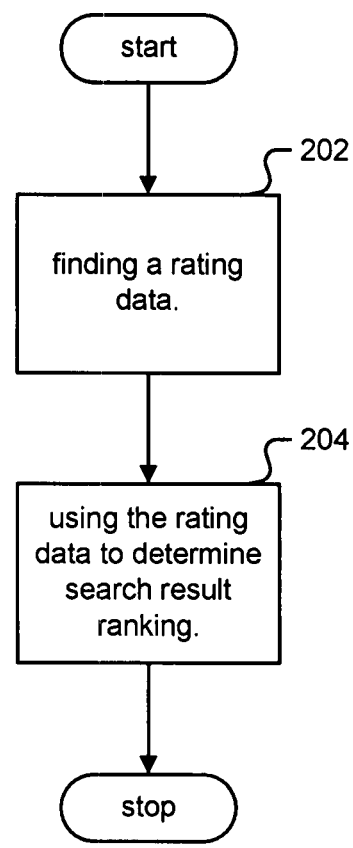
FIG. 2 is a flowchart illustrating an embodiment of a process to facilitate media content search with rating data.

FIG. 2 is a flowchart illustrating an embodiment of a process to facilitate media content search with rating data. The process may be implemented in web agent 108.

In step 202, a rating data associated with the media content is found at least in part programmatically, in a location other than the display page on media site 112 that includes media content or a link to the media content. In some embodiments, the web agent 108 parses media data associated with the media content to match the media content with an offline counterpart and find the rating data associated with the offline counterpart.

In a step 204, the rating data is used to determine or update a search result ranking. In some embodiments, the web agent 108 incorporates the rating data into a ranking algorithm used to determine the search result ranking for the media content.

Figure 3:
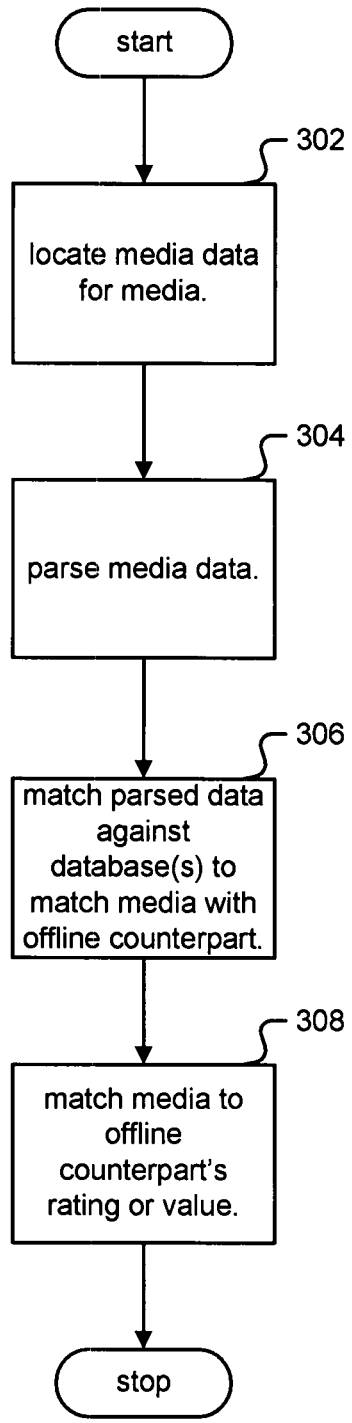
FIG. 3 is a flowchart illustrating an embodiment of a process to find a rating data.

FIG. 3 is a flowchart illustrating an embodiment of a process to find a rating data. In some embodiments, the process of FIG. 3 is included in 202 of FIG. 2. The process may be implemented in web agent 108.

In step 302, media data is located for the media content. Media data includes any available indexed text and/or metadata associated with the media content, for example a video with the name of a television show and an airdate as its text description. In step 304, the media data is parsed. For example, given the example of a video with the name of a television show and an airdate as its text description, parsing rules can be developed to extract the name of the show and the airdate.

In step 306, the parsed data is matched against one or more databases to match the media content with an offline counterpart. For example, given the example of a video with the name of a television show and an airdate as its text description, the video is matched with an offline counterpart of an actual television show's showing of a particular episode.

In step 308, the offline counterpart's rating or value is matched with the media content to provide rating data for the media content. In some embodiments rating data includes:
  review data, including a movie review, a video review, a music review and a performance review;
  download data, including site download statistics and aggregate download statistics across multiple locations;
  airplay data, including times, dates and location;
  attendance data;
  sales data, including box office sales data, music sales data, and retail sales data;
  user rating data, including an online community aggregate rating and an online community average rating; and
  industry rating data, including an MPAA rating, a Billboard rating, an Academy Awards nomination/award, an Emmy Awards nomination/award, and a Nielsen rating.

Figure 4:
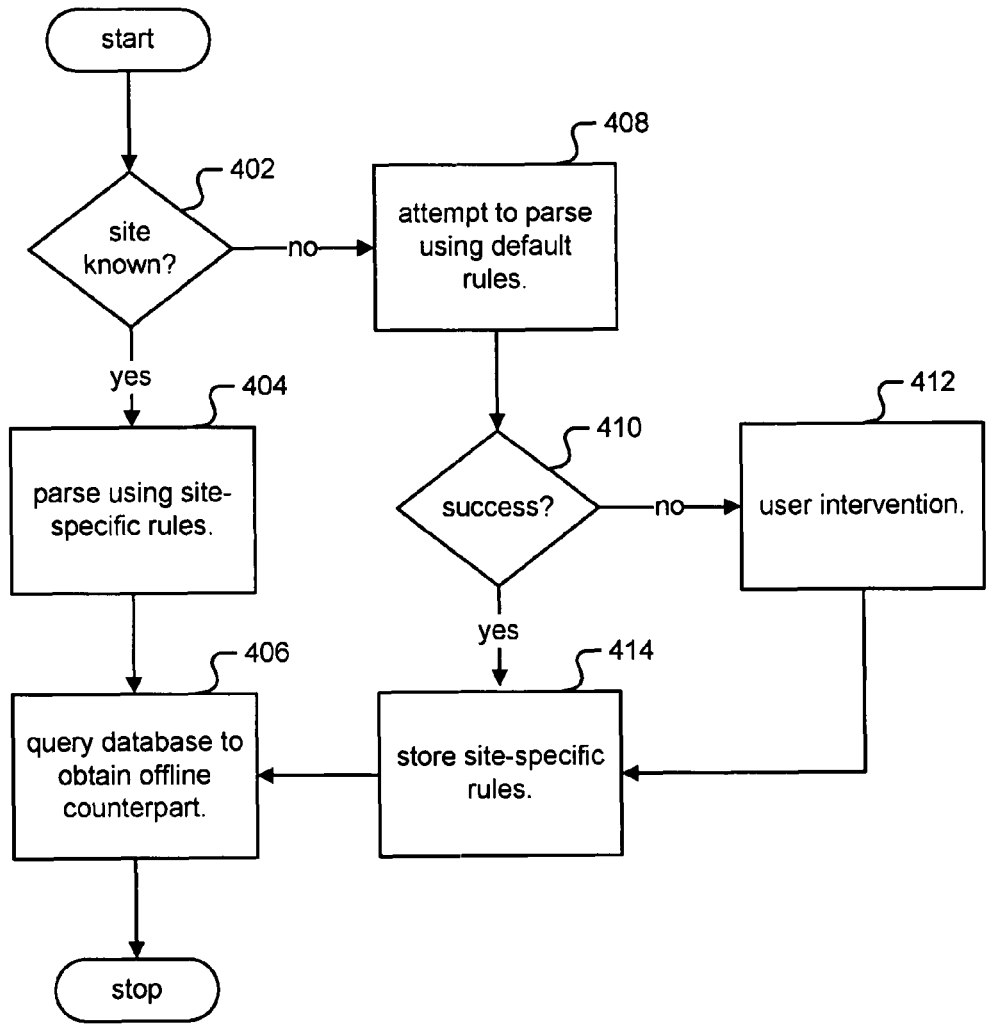
FIG. 4 is a flowchart illustrating an embodiment of a process to match media content with an offline counterpart.

FIG. 4 is a flowchart illustrating an embodiment of a process to match media content with an offline counterpart. In some embodiments, the process of FIG. 4 is included in 304 and 306 of FIG. 3. The process may be implemented in web agent 108.

If it is determined in step 402 that the media site 112 displaying the display page with the media content has been previously traversed and therefore is "known" by web agent 108, then control is transferred to step 404. Otherwise, control is transferred to step 410.

In step 404, the site-specific rules are used to parse the media data. In some embodiments the set of parsing rules is applied to obtain the name of a show, the name of an episode, and the airdate of an episode. For example, the media data for a video related to a television show may include the video description "Star Trak Moment—'Tomorrow' (Airdate: Feb. 1, 1968)," and the parsing rules obtain the name of the show as "Star Trak", the name of the episode as "Tomorrow" and the airdate of the episode as Feb. 1, 1968.

In step 406, a database is queried with the results of the parsing in 404 to obtain identifying information about the media content. For example, a video classified with a name of a show, a name of an episode, and an airdate, can be programmatically matched to a unique episode by querying an episode database that includes the name of the show, the name of the episode, the season number, and the episode number. In some embodiments, the season number can be deduced from the name of the show and the airdate of the episode. For example, a video associated with a television show called "Star Trak", an episode "Tomorrow" and the airdate Feb. 1, 1968 may be classified as matching season 2, episode 18 of the show "Star Trak". In some embodiments an episode database may be available online or in other electronic forms. For other types of media content, including sports events and news, similar classification rules are developed to obtain a match against a unique event.

In step 408, a set of default rules is used to parse the media data. If it is determined in step 410 that the video data is successfully parsed to obtain classifying information, then control is transferred to step 414. Otherwise, control is transferred to step 412. In step 412, user intervention is requested to manually establish rules to parse the media data. In step 414, the rules are stored as site-specific rules for future processing.

Figure 5:
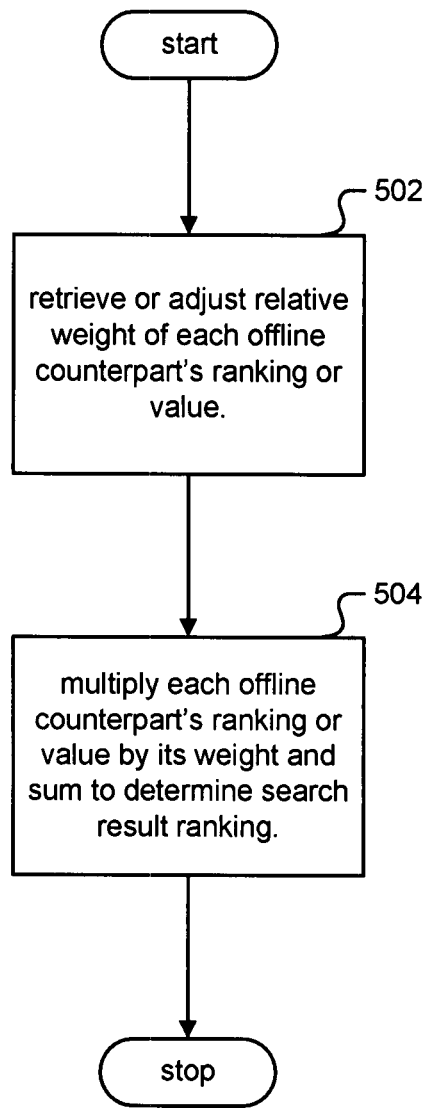
FIG. 5 is a flowchart illustrating an embodiment of a process to use the rating data to determine a search result ranking.

FIG. 5 is a flowchart illustrating an embodiment of a process to use the rating data to determine a search result ranking. In some embodiments, the process of FIG. 5 is included in 204 of FIG. 2. The process may be implemented in web agent 108.

In step 502, the relative weight of each offline counterpart's ranking or value is retrieved or adjusted. In some embodiments, given a set of search results for a search query for media content, each result may have an original relevancy score of X. If all the elements of the search results set use the same rating system, then a new relevancy score can be assigned. For example, the new relevancy score can be Z, where $Z=X+(w*Y)$, where w is a coefficient used to determine the relative weight of the rating data Y.

If the search result set is such that not all the elements are assigned the same type of data, then a new relevancy score can still be achieved by using one of several methods. For example, coefficients can be developed to equate the relative weights of different scores, if different elements in the result set use different scores. For example, if one video uses a Nielsen rating and another video uses a rating from a different provider, then different coefficients are used. Alternatively, videos that are assigned particular scores can by default rank higher than videos that are not.

In step 504, each offline counterpart's ranking or value is multiplied by its weight and summed to determine a search result ranking. If multiple offline rankings are assigned to media content, then the new relevancy score can be the sum of the original relevancy and of all the offline rankings, with different coefficients used to determine the relative weights of the different offline ratings. So, the new relevancy score can be Z, where $Z=X+(w1*Y1)+(w2*Y2)+\ldots$, where wn is a weighing coefficient and Yn is an offline score.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
receiving a media data associated with a video on a display page, wherein the video is to be indexed for media content search;
in the event a media site associated with the display page is known, programmatically parsing the media data to extract a video attribute by selecting a site-specific set of parsing rules;
in the event the media site is not known, parsing the media data to extract the video attribute, comprising requesting user intervention if a default set of parsing rules are not successful;
matching the video to a unique television show episode by querying an episode database with the video attribute;
finding a television viewing rating associated with the unique television show episode, wherein the television viewing rating comprises a plurality of ratings each from a corresponding source;
receiving a relevancy score for the video in relation to a set of search results for a media content search query; and
adjusting the relevancy score for the video as a function of the television viewing rating, wherein adjusting comprises calculating a weighted sum based at least in part on a relative weight of each respective rating data's source and a weighing coefficient.

2. A method as recited in claim 1, wherein the television viewing rating comprises one or more of: an estimate of the number of viewing households for a showing of an episode of a television show, a television show franchise, and a sports event.

3. A method as recited in claim 1, wherein the television viewing rating comprises review data.

4. A method as recited in claim 1, wherein the television viewing rating comprises a Nielsen rating.

5. A method as recited in claim 1, wherein the unique television show episode comprises one of: an airing of a television show, a musical, a play, a motion picture, a sports match, a game, and a performance.

6. A method as recited in claim 1, wherein adjusting comprises incorporating the television viewing rating into a ranking algorithm used to determine a search result ranking.

7. A method as recited in claim 1, wherein the video attribute comprises one or more of: an episode name, a show name, and an airdate.

8. A method as recited in claim 1, wherein the key attribute is a season and episode number.

9. A method as recited in claim 1, wherein the unique television show episode is an offline show.

10. A method as recited in claim 1, further comprising, in the event the media site is not known, parsing the media data to extract the video attribute, comprising storing the successful set of parsing rules as the site-specific set of parsing rules.

11. A system comprising
a processor; and
a memory coupled with the processor, wherein the memory is configured to provide the processor with instructions which when executed cause the processor to:
receive a media data associated with a video on a display page, wherein the video is to be indexed for media content search;
in the event a media site associated with the display page is known, to programmatically parse the media data to extract a video attribute by selecting a site-specific set of parsing rules;
in the event the media site is not known, to parse the media data to extract the video attribute, comprising to request user intervention if a default set of parsing rules are not successful;
match the video to a unique television show episode by querying an episode database with the video attribute;
find a television viewing rating associated with the unique television show episode, wherein the television viewing rating comprises a plurality of ratings each from a corresponding source;
receive a relevancy score for the video in relation to a set of search results for a media content search query; and
adjust the relevancy score for the video as a function of the television viewing rating, wherein adjusting comprises calculating a weighted sum based at least in part on a relative weight of each respective rating data's source and a weighing coefficient.

12. A system as recited in claim 11, wherein the unique television show episode comprises one of: an airing of a television show, a musical, a play, a motion picture, a sports match, a game, and a performance.

13. A computer program product, the computer program product being embodied in a computer readable storage medium and comprising computer instructions for:
   receiving a media data associated with a video on a display page, wherein the video is to be indexed for media content search;
   in the event a media site associated with the display page is known, programmatically parsing the media data to extract a video attribute by selecting a site-specific set of parsing rules;
   in the event the media site is not known, parsing the media data to extract the video attribute, comprising requesting user intervention if a default set of parsing rules are not successful;
   matching the video to a unique television show episode by querying an episode database with the video attribute;
   finding a television viewing rating associated with the unique television show episode, wherein the television viewing rating comprises a plurality of ratings each from a corresponding source;
   receiving a relevancy score for the video in relation to a set of search results for a media content search query; and
   adjusting the relevancy score for the video as a function of the television viewing rating, wherein adjusting comprises calculating a weighted sum based at least in part on a relative weight of each respective rating data's source and a weighing coefficient.

14. A computer program product as recited in claim 13, wherein the unique television show episode comprises one of: an airing of a television show, a musical, a play, a motion picture, a sports match, a game, and a performance.

* * * * *